(12) United States Patent
Yamada (10) Patent No.: US 12,397,542 B2
(45) Date of Patent: Aug. 26, 2025

(54) LIQUID DISCHARGE SYSTEM, SERVER, AND CONTROL METHOD OF LIQUID DISCHARGE SYSTEM

(71) Applicant: SEIKO EPSON CORPORATION, Tokyo (JP)

(72) Inventor: Toshimichi Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 254 days.

(21) Appl. No.: 18/192,305

(22) Filed: Mar. 29, 2023

(65) Prior Publication Data

US 2023/0311481 A1 Oct. 5, 2023

(30) Foreign Application Priority Data

Mar. 31, 2022 (JP) .................. 2022-058936

(51) Int. Cl.
*B41J 2/045* (2006.01)
*G06F 3/12* (2006.01)

(52) U.S. Cl.
CPC ....... *B41J 2/04508* (2013.01); *B41J 2/04513* (2013.01); *B41J 2/04581* (2013.01); *G06F 3/1232* (2013.01)

(58) Field of Classification Search
CPC .................................................. B41J 2/04513
See application file for complete search history.

(56) References Cited

U.S. PATENT DOCUMENTS

| | | | | |
|---|---|---|---|---|
| 2006/0055745 | A1* | 3/2006 | Yagi | B41J 2/14233 347/71 |
| 2006/0221142 | A1* | 10/2006 | Katayama | B41J 2/04563 347/68 |
| 2022/0203680 | A1* | 6/2022 | Hiwada | G01R 29/22 |

FOREIGN PATENT DOCUMENTS

| | | | |
|---|---|---|---|
| JP | 10193613 A | * | 7/1998 |
| JP | 2009-066948 A | | 4/2009 |

OTHER PUBLICATIONS

Machine generated English translation of JP10193613A to Yoshida et al., "Method for Correcting Print and Ink Jet Printer Using It"; translation retrieved via espacenet on Feb. 4, 2025; 20pp.*

* cited by examiner

*Primary Examiner* — Shelby L Fidler
(74) *Attorney, Agent, or Firm* — Global IP Counselors, LLP (57) ABSTRACT

A liquid discharge system including a piezoelectric element that is displaced in accordance with a drive signal and discharges liquid; a drive signal output circuit that outputs the drive signal; a measurement circuit that measures a first capacitance of the piezoelectric element; and a determination circuit that determines a deterioration state of the piezoelectric element based on the first capacitance.

7 Claims, 7 Drawing Sheets

LIQUID DISCHARGE SYSTEM, SERVER, AND CONTROL METHOD OF LIQUID DISCHARGE SYSTEM

The present application is based on, and claims priority from JP Application Serial Number 2022-058936, filed Mar. 31, 2022, the disclosure of which is hereby incorporated by reference herein in its entirety.

BACKGROUND

1. Technical Field

The present disclosure relates to a liquid discharge system, a server, and a control method of a liquid discharge system.

2. Related Art

An ink jet printer or the like is known as a liquid discharge system that discharges liquid onto a medium. In the liquid discharge system, pressure is generated in a pressure generation chamber by displacement of a piezoelectric element so that liquid is discharged from a nozzle communicating with the pressure generation chamber. The discharged liquid lands on a medium so as to form a desired image on the medium. In such a liquid discharge system, a piezoelectric element is repeatedly driven such that a desired image is formed on the medium. Accordingly, the displacement amount of a piezoelectric element gradually decreases with repeated driving, which causes a decrease in the amount of liquid discharged from a nozzle. Such a decrease in the liquid discharge amount might deteriorate the quality of an image formed on the medium.

To deal with such a problem, JP-A-2009-066948 discloses a mechanism to count the number of liquid discharge times and to correct a voltage of a drive signal driving a piezoelectric element in accordance with the number of counts. The mechanism reduces the risk of decreasing the displacement amount of the piezoelectric element and thus reduces the risk of decreasing the liquid discharge amount from a nozzle.

However, a decrease in the displacement amount of a piezoelectric element is caused not only by the number of drive times of a piezoelectric element, but also by a plurality of the other factors, such as a use environment, the value of a supply voltage, and the like. Accordingly, the technique disclosed in JP-A-2009-066948, which corrects the voltage of a drive signal driving a piezoelectric element in accordance with the number of discharge times, is not sufficient for dealing with the problem, and room for improvement thus remains.

SUMMARY

According to an aspect of the present disclosure, there is provided a liquid discharge system including: a piezoelectric element that is displaced based on a drive signal and discharges liquid; a drive signal output circuit that outputs the drive signal; a measurement circuit that measures a first capacitance of the piezoelectric element; and a determination circuit that determines a deterioration state of the piezoelectric element based on the first capacitance.

According to another aspect of the present disclosure, there is provided a server configured to communicate with a liquid discharge apparatus including a piezoelectric element that is displaced based on a drive signal and discharges liquid, the server including: a reception section that receives capacitance information including a capacitance of the piezoelectric element measured by a measurement circuit; a determination circuit that determines a deterioration state of the piezoelectric element based on the capacitance information; and a transmission section that transmits determination result information including a determination result of the determination circuit.

According to still another aspect of the present disclosure, there is provided a control method of a liquid discharge system including a piezoelectric element that is displaced based on a drive signal and discharges liquid, and a drive signal output circuit that outputs the drive signal, the control method including: a measurement step of measuring a capacitance of the piezoelectric element; and a determination step of determining a deterioration state of the piezoelectric element based on the capacitance.

DESCRIPTION OF EXEMPLARY EMBODIMENTS

In the following, a description will be given of preferred embodiments of the present disclosure with reference to the drawings. The drawings provided are illustrated for convenience of explanation. In this regard, the embodiments described below do not unreasonably restrict the contents described in the scope of the claims. Note that not all the components of the configurations described below are necessarily mandatory constituent features.

1. First Embodiment

Functional Configuration and Operation of Liquid Discharge System SY

Figure 1:
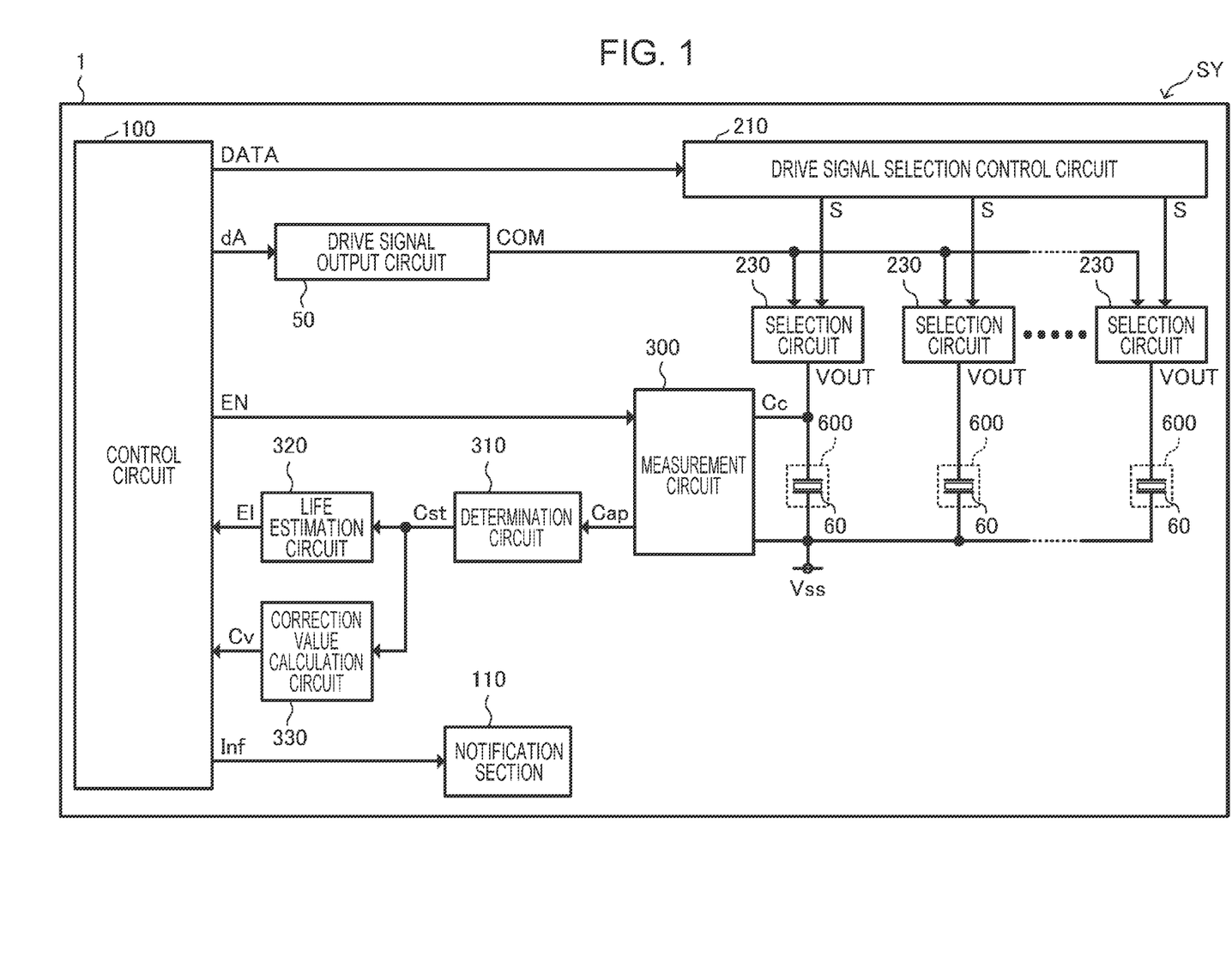
FIG. 1 is a diagram illustrating the configuration to a liquid discharge system.

FIG. 1 is a diagram illustrating the configuration of a liquid discharge system SY according to a first embodiment. As illustrated in FIG. 1, the liquid discharge system SY according to the first embodiment includes a liquid discharge apparatus 1 that discharges liquid. A description will be given on the assumption that the liquid discharge apparatus 1 according to the first embodiment is a so-called ink jet printer that discharges ink, as an example of a liquid, onto a medium so as to form a desired image on the medium. However, the liquid discharge apparatus 1 is not limited to this. The liquid discharge apparatus 1 may be a color material discharge apparatus used for manufacturing a color filter of a liquid crystal display or the like, an electrode material discharge apparatus used for forming an electrode of an organic EL display, a surface emitting display, or the like, a bioorganic matter discharge apparatus used for biochip manufacturing, or the like.

As illustrated in FIG. 1, the liquid discharge apparatus 1 includes a control circuit 100, a notification section 110, a drive signal output circuit 50, a drive signal selection control circuit 210, n selection circuits 230, a measurement circuit 300, a determination circuit 310, a life estimation circuit 320, a correction value calculation circuit 330, and n discharge sections 600.

Image data including information on an image to be formed on the medium is input to the control circuit 100 from an external device not illustrated in the figure and disposed outside the liquid discharge apparatus 1. The control circuit 100 then controls each component of the liquid discharge apparatus 1 in accordance with the input image data.

Specifically, the control circuit 100 generates a discharge data signal DATA based on the image data input from the external device and outputs the discharge data signal DATA to the drive signal selection control circuit 210. The drive signal selection control circuit 210 generates selection signals S corresponding to n selection circuits 230 which are defined by the discharge data signal DATA at the timing defined by the input discharge data signal DATA and outputs the selection signals S to the respective selection circuits 230. That is to say, the discharge data signal DATA includes a signal defining the timing when the drive signal selection control circuit 210 outputs the selection signals S and signals defining the logical level of the selection signals S corresponding to the respective n selection circuits 230.

The control circuit 100 generates a reference drive signal dA and outputs the reference drive signal dA to the drive signal output circuit 50. The drive signal output circuit 50 converts the reference drive signal dA, which is the input digital signal, into an analog signal and amplifies the converted analog signal so as to generate a drive signal COM. The drive signal output circuit 50 then outputs the drive signal COM to n selection circuits 230. That is to say, the control circuit 100 outputs the reference drive signal dA that defines the signal waveform of the drive signal COM to the drive signal output circuit 50, and the drive signal output circuit 50 amplifies the signal waveform defined by the input reference drive signal dA so as to generate the drive signal COM and outputs the drive signal COM to n selection circuits 230. In other words, the liquid discharge system SY includes the drive signal output circuit 50 that outputs the drive signal COM.

It is preferable that the drive signal output circuit 50 as described above amplify an analog signal based on the reference drive signal dA and include an amplifier circuit, such as a class A amplifier circuit, a class B amplifier circuit, a class AB amplifier circuit, a class D amplifier circuit, or the like. It is also preferable that the reference drive signal dA output by the control circuit 100 define the signal waveform of the drive signal COM output by the drive signal output circuit 50 and be an analog signal.

Figure 2:
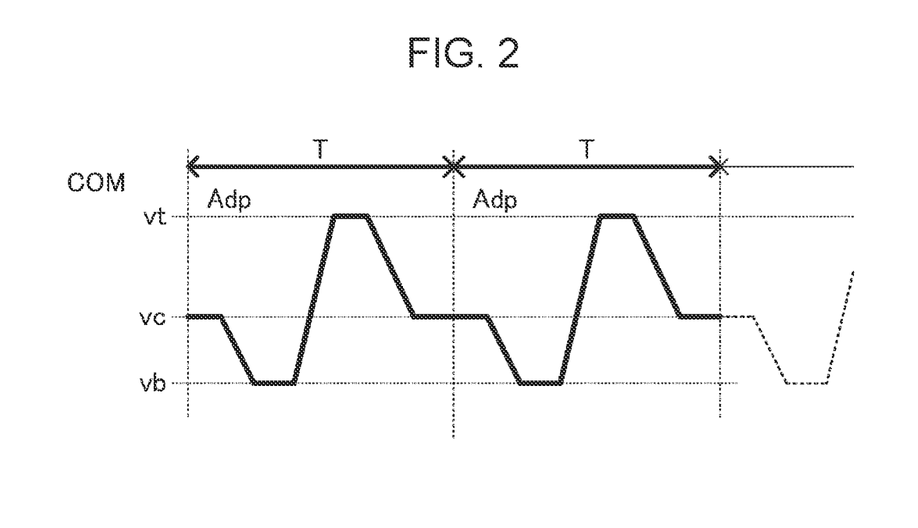
FIG. 2 is a diagram illustrating an example of the signal waveform of a drive signal COM.

Here, a description will be given of an example of the signal waveform of the drive signal COM output by the drive signal output circuit 50. FIG. 2 is a diagram illustrating an example of the signal waveform of the drive signal COM. As illustrated in FIG. 2, the drive signal COM includes a trapezoid waveform Adp for each predetermined period. The trapezoid waveform Adp includes a fixed period at a voltage vc, a fixed period at a voltage vb having a voltage value lower than the voltage vc subsequent to the fixed period at the voltage vc, a fixed period at a voltage vt having a voltage value higher than the voltage vc subsequent to the fixed period at the voltage vb, and a fixed period at the voltage vc subsequent to the fixed period at the voltage vt. That is to say, the drive signal output circuit 50 outputs the drive signal COM including the trapezoid waveform Adp that begins at the voltage vc, changes to voltages vb and vt, and ends at the voltage vc.

Here, in the following description, the potential difference between the voltage vt and the voltage vb may be referred to as the amplitude of the drive signal COM. In this regard, the signal waveform of the drive signal COM output by the drive signal output circuit 50 is not limited to the shape illustrated in FIG. 2. The drive signal output circuit 50 may output a drive signal COM including a signal waveform having various shapes in accordance with the physical property of the ink discharged onto the medium, the frequency of the drive signal COM, the transport speed of the medium, and the like.

Referring back to FIG. 1, a selection signal S output by the drive signal selection control circuit 210 and the drive signal COM output by the drive signal output circuit 50 are input to the n selection circuits 230. The n selection circuits 230 then determine the trapezoid waveform Adp of the drive signal COM to be selected or deselected in accordance with the logical level of the input selection signal S so as to generate and output a drive signal VOUT. Specifically, when a selection circuit 230 determines the trapezoid waveform Adp of the drive signal COM to be selected based on the logical level of the selection signal S, the selection circuit 230 outputs the drive signal VOUT including the trapezoid waveform Adp. On the other hand, when a selection circuit 230 determines the trapezoid waveform Adp of the drive signal COM to be deselected based on the logical level of the selection signal S, the selection circuit 230 outputs the drive signal VOUT not including the trapezoid waveform Adp. At this time, a voltage Vc having a fixed value, which corresponds to the immediately preceding voltage and is held by a capacitance component of a piezoelectric element 60, is held at the output end of the selection circuit 230. That is to say, when the selection circuit 230 determines the trapezoid waveform Adp of the drive signal COM to be deselected based on the logical level of the selection signal S, the selection circuit 230 outputs the drive signal VOUT having the fixed voltage Vc.

The n discharge sections 600 have respective piezoelectric elements 60 and are disposed correspondingly to the n selection circuits 230. One end of the piezoelectric elements 60 included in the respective n discharge sections 600 is supplied with the drive signals VOUT output by the corresponding selection circuits 230. The other end of the piezoelectric elements 60 included in the respective n discharge sections 600 is commonly supplied with a voltage Vss. The piezoelectric elements 60 included in the respective n discharge sections 600 are driven by the respective potential differences between the drive signals VOUT supplied to one end and the voltage Vss supplied to the other end. The amount of ink in accordance with driving of the piezoelectric elements 60 is output from the discharge section 600. Here, the voltage Vss supplied to the other end of the piezoelectric elements 60 is a reference voltage signal for driving the piezoelectric elements 60 and may be, for example, a ground potential having a fixed voltage or a fixed voltage signal of 5.5 V or 6 V.

Figure 3:
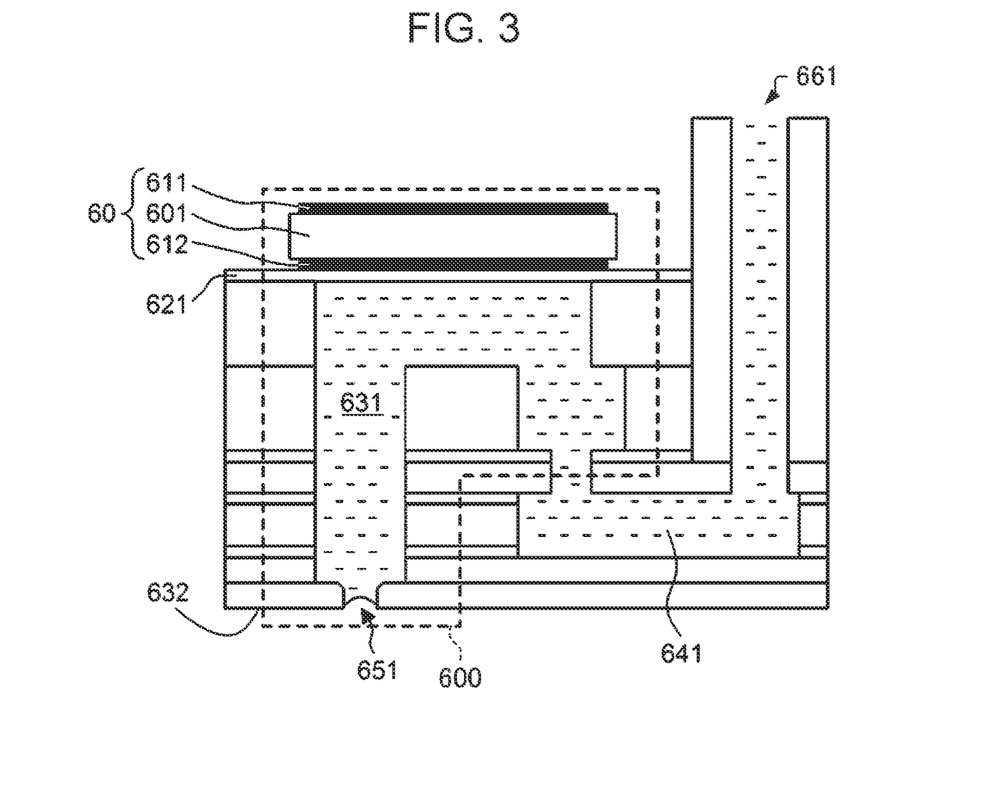
FIG. 3 is a diagram illustrating an example of the schematic configuration of a discharge section.

Here, a description will be given of a specific example of the configuration of the discharge sections 600 including the respective piezoelectric elements 60. FIG. 3 is a diagram illustrating an example of the schematic configuration of one discharge section 600 of the n discharge sections 600. FIG. 3 also illustrates a nozzle plate 632, a reservoir 641, and a supply port 661 in addition to the discharge section 600. As illustrated in FIG. 3, the discharge section 600 includes the piezoelectric element 60, a vibration plate 621, a cavity 631, and a nozzle 651.

The piezoelectric element 60 includes a piezoelectric body 601 and electrodes 611 and 612. In the piezoelectric element 60, the electrodes 611 and 612 are positioned so as to sandwich the piezoelectric body 601. The piezoelectric element 60 as described above is driven such that the central part thereof is displaced in the vertical direction in accordance with the potential difference between the voltage of the signal supplied to the electrode 611 and the voltage of the signal supplied to the electrode 612. Specifically, the electrode 611, which is one end, is supplied with the drive signal VOUT, and the electrode 612, which is the other end, is supplied with the voltage Vss. When the voltage of the drive signal VOUT, supplied to the electrode 611, is changed, the potential difference between the drive signal VOUT supplied to the electrode 611 and the voltage Vss supplied to the electrode 612 is changed. As a result, the central part of the piezoelectric element 60 is driven so as to be displaced in the vertical direction. On the other hand, when the voltage of the drive signal VOUT, supplied to the electrode 611, is not changed, the potential difference between the drive signal VOUT supplied to the electrode 611 and the voltage Vss supplied to the electrode 612 is not changed. As a result, the displacement of the central part of the piezoelectric element 60 is held in a fixed state. That is to say, when the drive signal VOUT including the trapezoid waveform Adp with a changing voltage value is supplied to the electrode 611, the piezoelectric element 60 is driven, whereas when the electrode 611 is supplied with the drive signal VOUT having the fixed voltage Vc, the piezoelectric element 60 is not driven.

The vibration plate 621 is positioned below the piezoelectric element 60 in FIG. 3. In other words, the piezoelectric element 60 is formed on the upper surface of the vibration plate 621 in FIG. 3. The vibration plate 621 as described above is displaced in the vertical direction with the driving of the piezoelectric element 60.

The cavity 631 is positioned below the vibration plate 621 in FIG. 3. Ink is supplied to the cavity 631 from the reservoir 641. Ink stored in an ink cartridge, not illustrated in the figure, held by the liquid discharge apparatus 1 or the like is fed to the reservoir 641 via the supply port 661. The internal volume of the cavity 631 as described above is expanded or reduced with the displacement of the vibration plate 621 in the vertical direction. That is to say, the vibration plate 621 functions as a diaphragm that changes the internal volume of the cavity 631, and the cavity 631 functions as a chamber that changes the pressure with displacement of the vibration plate 621 in the vertical direction.

The nozzle 651 is an opening disposed on the nozzle plate 632 and communicates with the cavity 631. When the internal volume of the cavity 631 is changed, the internal pressure of the cavity 631 is changed in accordance with a change in the internal volume, and the ink filled in the cavity 631 is discharged from the nozzle 651.

In the discharge section 600 configured as described above, when the piezoelectric element 60 is driven so as to be bent in the up direction, the vibration plate 621 is displaced in the up direction. Thereby, the internal volume of the cavity 631 is expanded. As a result, the ink stored in the reservoir 641 is drawn into the cavity 631. On the other hand, when the piezoelectric element 60 is driven so as to be bent in the down direction, the vibration plate 621 is displaced in the down direction. Thereby, the internal volume of the cavity 631 is reduced. As a result, the amount of ink in accordance with the degree of the reduction of the internal volume of the cavity 631 is discharged from the nozzle 651.

Specifically, in the period in which the drive signal VOUT having a fixed voltage Vc is supplied to the electrode 611 of the piezoelectric element 60, the displacement amount of the piezoelectric element 60 remains fixed. Accordingly, ink is not discharged from a nozzle 651 corresponding to the piezoelectric element 60. Next, when the voltage of the drive signal VOUT supplied to the electrode 611 of the piezoelectric element 60 is changed from the voltage vc to the voltage vb, the piezoelectric element 60 is driven so as to be displaced in the up direction illustrated in FIG. 3 in accordance with the change in the voltage of the drive signal VOUT. Thereby, the vibration plate 621 is displaced in the up direction illustrated in FIG. 3, and the internal volume of the cavity 631 is expanded. As a result, the ink stored in the reservoir 641 is drawn into the cavity 631. Next, when the voltage of the drive signal VOUT supplied to the electrode 611 of the piezoelectric element 60 is changed from the voltage vb to the voltage vt, the piezoelectric element 60 is driven so as to be displaced in the down direction illustrated in FIG. 3 in accordance with the change in the voltage of the drive signal VOUT. Thereby, the vibration plate 621 is displaced in the down direction illustrated in FIG. 3, and the internal volume of the cavity 631 is reduced. As a result, the ink stored in the cavity 631 is discharged from the nozzle 651.

As described above, the piezoelectric element 60 is driven in accordance with a change in the voltage of the drive signal VOUT supplied to the electrode 611. The discharge section 600 then discharges the amount of ink in accordance with the drive amount of the piezoelectric element 60. In other words, the piezoelectric element 60 is displaced in accordance with the drive signal VOUT based on the drive signal COM to discharge ink. At this time, the displacement amount of the piezoelectric element 60, which is the drive amount, and the ink discharge amount depend on the characteristic of the piezoelectric element 60 and the respective values of the voltages vc, vt, and vb supplied to the piezoelectric element 60.

In this regard, it is preferable that the piezoelectric element 60 be configured to be driven in accordance with the voltage value of the supplied drive signal VOUT and discharge ink from a corresponding nozzle 651 when driven, noting that such a configuration is not limited to the one example illustrated in FIG. 3.

Referring back to FIG. 1, the measurement circuit 300 obtains at least one voltage value of the n piezoelectric elements 60 as a detection voltage Cc. Specifically, the measurement circuit 300 obtains the voltage value of at least one electrode 611 of the n piezoelectric elements 60 as the detection voltage Cc by receiving input of an enable signal EN, which enables detection of a voltage value, from the control circuit 100. The measurement circuit 300 then generates a detection signal Cap corresponding to the capacitance of the piezoelectric element 60 based on the obtained detection voltage Cc and outputs the detection signal Cap to the determination circuit 310. That is to say, the measurement circuit 300 measures the capacitance of the piezoelectric element 60 and outputs the detection signal Cap corresponding to the capacitance. In this regard, a detailed description will be given later of the measurement circuit 300.

Here, the measurement of the capacitance by the measurement circuit 300 is not limited to direct measurement of the capacitance of the piezoelectric element 60 by the measurement circuit 300 and includes the case of measuring a physical quantity that changes in accordance with the capacitance value. Specifically, the measurement circuit 300 may obtain the voltage value of the piezoelectric element 60 when a fixed current or voltage is supplied to the piezoelectric element 60 so as to measure a time required for charging the piezoelectric element 60 that changes with the capacitance of the piezoelectric element 60 as the capacitance of the piezoelectric element 60, and may output a measurement result as the detection signal Cap. The measurement circuit 300 may also obtain the voltage value of the piezoelectric element 60 when a charge stored in the piezoelectric element 60 is discharged so as to measure a time required for discharging a charge that is changed by the capacitance of the piezoelectric element 60 as the capacitance of the piezoelectric element 60, and may output a measurement result as the detection signal Cap. Further, the measurement circuit 300 may measure the value of the charging voltage provided to the piezoelectric element 60 in a fixed time that changes with the capacitance of the piezoelectric element 60 as the capacitance of the piezoelectric element 60, and may output a measurement result as the detection signal Cap.

In this regard, in FIG. 1, the example in which the measurement circuit 300 detects the voltage value of one piezoelectric element 60 is illustrated. However, the measurement circuit 300 may detect the voltage values of a plurality of piezoelectric elements 60. That is to say, the number of piezoelectric elements 60 whose capacitance is measured by the measurement circuit 300 is not limited to one and may be plural. Also, when the measurement circuit 300 measures the capacitance of a plurality of piezoelectric elements 60, the measurement circuit 300 may separately measure the capacitances of the plurality of piezoelectric elements 60 or may measure the combined capacitance of the plurality of piezoelectric elements 60.

The determination circuit 310 receives an input of the detection signal Cap. The determination circuit 310 determines a deterioration state of the piezoelectric element 60 based on the input detection signal Cap. For example, the determination circuit 310 may determine the deterioration state of the piezoelectric element 60 in accordance with the capacitance value of the piezoelectric element 60 based on the detection signal Cap. Also, the determination circuit 310 may calculate a change rate of the capacitance of the piezoelectric element 60 from the capacitance of the piezoelectric element 60 based on the input detection signal Cap and the initial value of the capacitance of the piezoelectric element 6, and may determine the deterioration state of the piezoelectric element 60 in accordance with the calculated change rate. The determination circuit 310 then classifies the deterioration state of the piezoelectric element 60 based on a determination result. For example, the determination circuit 310 classifies the deterioration state into a normal rank, a subnormal rank, a slightly abnormal rank, a moderately abnormal rank, and a severely abnormal rank. Next, the determination circuit 310 generates a state signal Cst including the information on the rank as a determination result of the deterioration state of the piezoelectric element 60, and outputs the state signal Cst to the life estimation circuit 320 and the correction value calculation circuit 330. In this regard, the classification of the rank determined by the determination circuit 310 is not limited to the classification described above.

The life estimation circuit 320 estimates the life of the piezoelectric element 60 based on the input state signal Cst. For example, when the rank of the deterioration state based on the input state signal Cst is the normal rank, the subnormal rank, or the slightly abnormal rank, the life estimation circuit 320 estimates that the piezoelectric element 60 has a sufficient life. Also, when the rank of the deterioration state based on the input state signal Cst is the moderately abnormal rank, the life estimation circuit 320 estimates that the piezoelectric element 60 soon reaches the end of life. Also, when the rank of the deterioration state based on the input state signal Cst is the severely abnormal rank, the life estimation circuit 320 estimates that the piezoelectric element 60 has already reached the end of its life. The life estimation circuit 320 then generates a life notification signal El including the information on the estimated life of the piezoelectric element 60, and outputs the life notification signal El to the control circuit 100.

When the life notification signal El input from the life estimation circuit 320 includes the information stating that the piezoelectric element 60 will soon reach the end of life or the information stating that the piezoelectric element 60 has already reached the end of life, the control circuit 100 generates a notification signal Inf for notifying a user of that the piezoelectric element 60 will soon reach the end of life, or that the piezoelectric element 60 has already reached the end of life, and outputs the notification signal Inf to the notification section 110. The notification section 110 notifies of the life information on the piezoelectric element 60 based on the input notification signal Inf. That is to say, the liquid discharge system SY includes the life estimation circuit 320 that estimates the life of the piezoelectric element 60 based on the deterioration state of the piezoelectric element 60 determined by the determination circuit 310 and the notification section 110 that notifies of the information on the life estimated by the life estimation circuit 320.

The correction value calculation circuit 330 determines whether or not to correct the voltage of the drive signal COM based on the input state signal Cst. Specifically, when the rank of the deterioration state based on the input state signal Cst is the normal rank or the subnormal rank, the correction value calculation circuit 330 determined that it is not necessary to correct the voltage of the drive signal COM. Also, when the rank of the deterioration state based on the input state signal Cst is the slightly abnormal rank, the correction value calculation circuit 330 generates a correction signal Cv for correcting the voltage of the drive signal COM by a voltage v1, and outputs the correction signal Cv to the control circuit 100. Also, when the rank of the deterioration state based on the input state signal Cst is the moderately abnormal rank, the correction value calculation circuit 330 generates the correction signal Cv for correcting the voltage of the drive signal COM by a voltage v2 higher than the voltage v1, and outputs the correction signal Cv to the control circuit 100. Also, when the rank of the deterioration state based on the input state signal Cst is the severely abnormal rank, the correction value calculation circuit 330 generates the correction signal Cv for correcting the voltage of the drive signal COM by a voltage v3 higher than the voltage v2 and outputs the correction signal Cv to the control circuit 100. In this regard, when the rank of the deterioration state based on the input state signal Cst is the severely abnormal rank, the correction value calculation circuit 330 may generate a correction signal Cv that stops the output of the drive signal COM and may output the correction signal Cv to the control circuit 100.

The control circuit 100 corrects the reference drive signal dA in accordance with the correction signal Cv input from the correction value calculation circuit 330. Thereby, the voltage of the drive signal COM generated based on the reference drive signal dA is corrected. Specifically, the control circuit 100 may make a correction so as to increase the voltage value of the voltage vt of the trapezoid waveform Adp included in the drive signal COM as the correction of the reference drive signal dA in accordance with the correction signal Cv input from the correction value calculation circuit 330. Also, the control circuit 100 may make a correction so as to increase the amplitude of the drive signal COM. That is to say, the correction value calculation circuit 330 corrects the voltage of the drive signal COM based on the state signal Cst in accordance with the detection signal Cap with the control circuit 100.

As described above, the liquid discharge system SY according to the first embodiment includes the piezoelectric element 60 that is displaced in accordance with the drive signal VOUT based on the discharges in drive signal COM to discharge ink, the drive signal output circuit 50 that outputs the drive signal COM, the measurement circuit 300 that measures the capacitance of the piezoelectric element 60, and the determination circuit 310 that determines the deterioration state of the piezoelectric element 60 based on the capacitance. Further, the liquid discharge system SY includes the correction value calculation circuit 330 that corrects the voltage of the drive signal COM based on the deterioration state of the piezoelectric element 60 determined by the determination circuit 310, the control circuit 100, the life estimation circuit 320 that estimates the life of the piezoelectric element 60 based on the deterioration state determined by the determination circuit 310, and the notification section 110 that notifies of the information on the life of the piezoelectric element 60 estimated by the life estimation circuit 320.

Here, with the liquid discharge system SY that drives the piezoelectric element 60 by the drive signal COM so as to discharge ink by driving the piezoelectric element 60, there is a widespread phenomenon that the displacement amount of the piezoelectric element is deteriorated by continuous driving of the piezoelectric element or the like. Up to this time, to deal with deterioration of the displacement amount that occurs with the piezoelectric element, the number of driven times of the piezoelectric element by the drive signal is counted, and the voltage of the drive signal is corrected so that deterioration of the drive signal that has occurred in the piezoelectric element is compensated. However, deterioration of the displacement amount that has occurred in the piezoelectric element is not only caused by the number of drive times of the piezoelectric element, but also caused by the drive conditions, such as the drive time of the piezoelectric element 60, the voltage of the drive signal COM supplied to the piezoelectric element 60, the ambient temperature of the piezoelectric element 60, and the like. Accordingly, by the related-art method in which the number of driven times of the piezoelectric element by the drive signal is counted to correct the drive signal, it has been difficult to suitably determine deterioration of the displacement amount of the drive element.

To handle such a problem, the present inventor focused attention on the point that there is a correlation between deterioration of the displacement amount of the piezoelectric element and a polarization change of the piezoelectric element, and realized the mechanism as follows. In the liquid discharge system SY, the measurement circuit 300 measures the capacitance of the piezoelectric element 60, and the determination circuit 310 determines the deterioration state of the piezoelectric element 60 based on the capacitance of the piezoelectric element 60 measured by the measurement circuit 300 so that the deterioration of the amount of change of the piezoelectric element 60 is detected without depending on the drive condition of the piezoelectric element 60.

Further, the liquid discharge system SY according to the first embodiment includes the correction value calculation circuit 330 that corrects the voltage of the drive signal COM based on the deterioration state of the piezoelectric element 60 determined by the determination circuit 310. Thereby, when deterioration occurs in the displacement amount of the piezoelectric element 60, it is possible to reduce the risk of variation of the amount of discharge liquid. That is to say, the discharge accuracy of ink in the liquid discharge system SY is improved.

Also, deterioration of the capacitance of the piezoelectric element 60 is caused by continuous drive of the piezoelectric element 60, and thus the capacitance of the piezoelectric element 60 decreases at the end of life. The liquid discharge system SY according to the first embodiment includes the life estimation circuit 320 that estimates the life of the piezoelectric element 60 based on the deterioration state of the piezoelectric element 60 determined by the determination circuit 310, and the notification section 110 that provides a notification of the information on the life of the piezoelectric element 60 estimated by the life estimation circuit 320. Accordingly, it is possible to notify the user of the life of the piezoelectric element 60 and the liquid discharge system SY at a suitable timing, and thus to improve user convenience.

Configuration and Operation of Measurement Circuit

Figure 4:
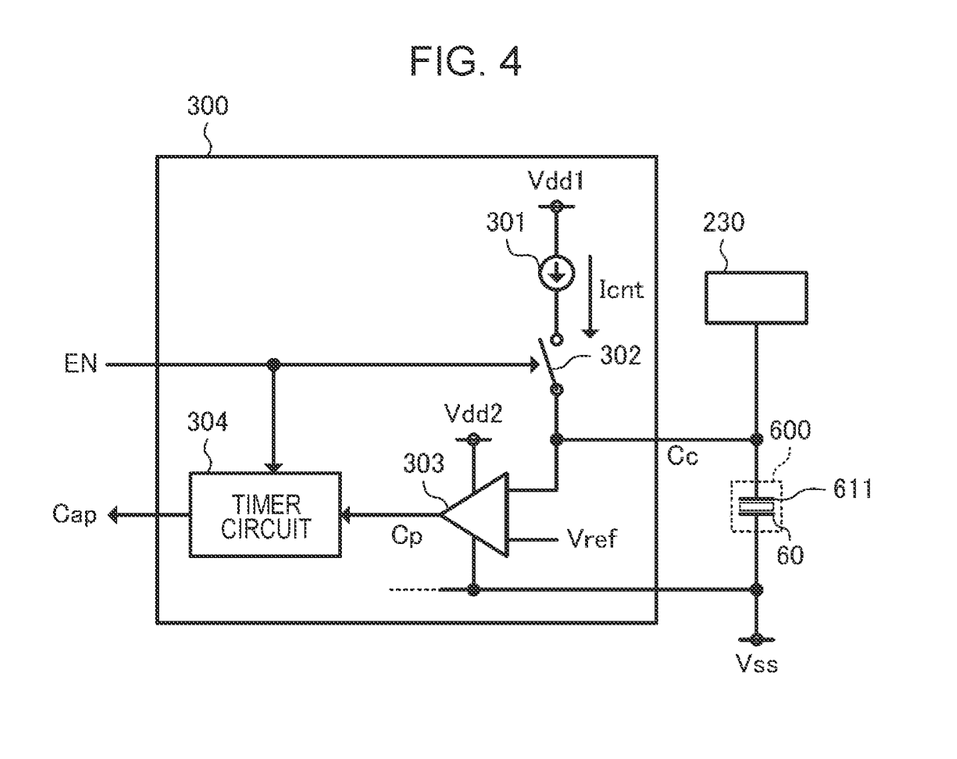
FIG. 4 is a diagram illustrating an example of the configuration of a measurement circuit.

Here, a description will be given of an example of the specific configuration and operation of the measurement circuit 300 that measures the capacitance of the piezoelectric element 60. FIG. 4 is a diagram illustrating an example of the configuration of the measurement circuit 300. As illustrated in FIG. 4, the measurement circuit 300 includes a current source 301 that outputs a constant current, a switch 302 that changes an electrical connection between the current source 301 and the piezoelectric element 60, a comparator 303 electrically coupled to the piezoelectric element 60, and a timer circuit 304 that measures a charging time Tch of the piezoelectric element 60 based on the output of the comparator 303.

The current source 301 is supplied with a voltage Vdd1. The current source 301 then generates a current Icnt having a fixed current value based on the voltage Vdd1 and outputs the current Icnt. The current source 301 as described above may be configured, for example, by one or a combination of a plurality of transistors, a constant-current Zener diode, or the like.

One end of the switch 302 is electrically coupled to the output of the current source 301, and the other end thereof is electrically coupled to the electrode 611 of the piezoelectric element 60. The conduction state of one end and the other end of the switch 302 is changed based on the enable signal EN input to the control end. Specifically, when the enable signal EN, which is an enable signal EN that enables detection of the capacitance of the piezoelectric element 60 in the measurement circuit 300 and enables the detection of the detection voltage Cc of the piezoelectric element 60, is input to the control end of the switch 302, the one end and the other end of the switch 302 are controlled to be conductive. When the enable signal EN, which is an enable signal EN that does not enable detection of the capacitance of the piezoelectric element 60 in the measurement circuit 300 and does not enable the detection of the detection voltage Cc of the piezoelectric element 60, is input to the control end of the switch 302, the one end and the other end of the switch 302 are controlled to be nonconductive. That is to say, the switch 302 controls the supply of the current Icnt to the piezoelectric element 60 depending on the enable signal EN.

A voltage Vdd2 is supplied to the high potential side power source terminal of the comparator 303, and the voltage Vss is supplied to the low potential side power source terminal of the comparator 303. Also, one input end of the comparator 303 is electrically coupled to the electrode 611 of the piezoelectric element 60, and a reference voltage Vref is input to the other input end of the comparator 303. When the detection voltage Cc, which is the voltage value of the electrode 611 of the piezoelectric element 60 input into the one input end, is higher than the reference voltage Vref, the comparator 303 outputs the H-level output voltage Cp, whereas when the detection voltage Cc is less than or equal to the reference voltage Vref, the comparator 303 outputs the L-level output voltage Cp.

The output voltage Cp output from the comparator 303 is input to the timer circuit 304. Also, the timer circuit 304 receives input of the enable signal EN and a clock pulse not illustrated in the figure. The timer circuit 304 calculates a time period from when the enable signal EN that enables detection of the capacitance of the piezoelectric element 60 in the measurement circuit 300 and that enables detection of the detection voltage Cc of the piezoelectric element 60 is input to the time when the output voltage Cp output from the comparator 303 becomes the H level based on the clock pulse. The timer circuit 304 outputs a calculation result as the detection signal Cap.

Figure 5:
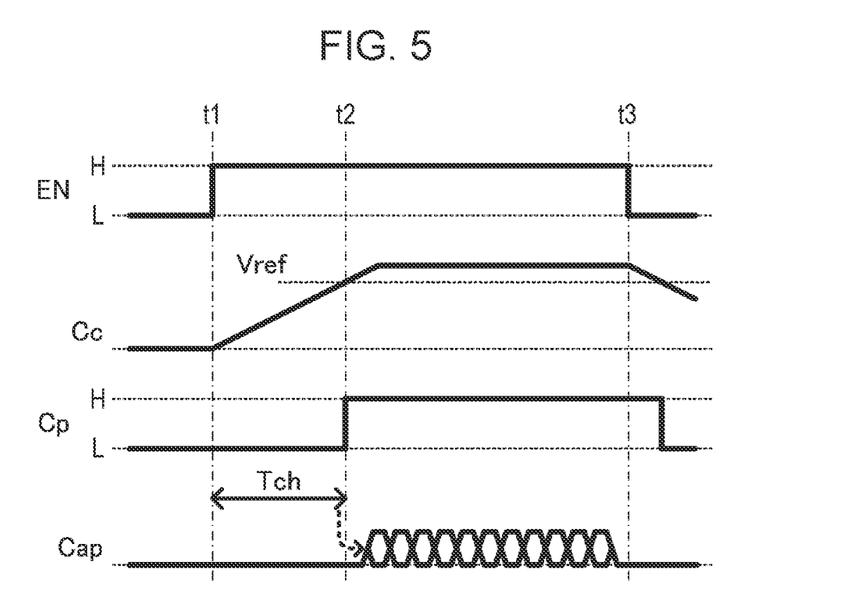
FIG. 5 is a diagram for explaining an example of the operation of the measurement circuit.

A description will be given of an example of the operation of the measurement circuit 300 configured as described above. FIG. 5 is a diagram illustrating an example of the operation of the measurement circuit 300. In this regard, FIG. 5 is illustrated on the assumption that the logical level of the enable signal EN that enables detection of the capacitance of the piezoelectric element 60 in the measurement circuit 300 is H level, and the logical level of the enable signal EN that does not enable detection of the capacitance of the piezoelectric element 60 in the measurement circuit 300 is L level.

As illustrated in FIG. 5, when the H-level enable signal EN is input to the measurement circuit 300 at time t1, one end and the other end of the switch 302 are controlled to be conductive. Thereby, the current Icnt output by the current source 301 is supplied to the piezoelectric element 60 via the switch 302. Accordingly, the voltage value of the piezoelectric element 60 rises based on the capacity component of the piezoelectric element 60 and the current value of the current Icnt. That is to say, the detection voltage Cc indicating the voltage value of the piezoelectric element 60 gradually increases.

Also, the H-level enable signal EN is input to the timer circuit 304 at time t1. The timer circuit 304 starts measuring time by receiving the input of the H-level enable signal EN. Specifically, the timer circuit 304 starts counting the number of pulses of the input clock pulse not illustrated in the figure.

Next, the detection voltage Cc indicating the voltage value of the piezoelectric element 60 exceeds the reference voltage Vref at time t2 so that the comparator 303 outputs the H-level output voltage Cp. The H-level output voltage Cp output by the comparator 303 is input to the timer circuit 304. The timer circuit 304 stops measuring time, that is to say, counting the number of pulses of the clock pulse by receiving input of the H-level output voltage Cp. The timer circuit 304 calculates the charging time Tch based on the counted number of pulses of the clock pulse. Next, the timer circuit 304 generates the detection signal Cap including the calculated charging time Tch and outputs the detection signal Cap.

At time t3 after the timer circuit 304 outputs the detection signal Cap, the L-level enable signal EN is input to the measurement circuit 300. Thereby, supply of the current Icnt output by the current source 301 to the piezoelectric element 60 is stopped. Accordingly, the voltage value of the piezoelectric element 60 gradually decreases. The detection voltage Cc indicating the voltage value of the piezoelectric element 60 becomes lower than or equal to the reference voltage Vref so that the comparator 303 outputs the L-level output voltage Cp. Thereby, calculation of the capacitance of the piezoelectric element 60 in the measurement circuit 300 is ended.

That is to say, in the measurement circuit 300 according to the first embodiment, by obtaining the detection voltage Cc indicating the voltage value of the piezoelectric element 60 when the current Icnt is supplied to the piezoelectric element 60, the charging time Tch required for charging the piezoelectric element 60, which changes depending on the capacitance of the piezoelectric element 60, is measured, and a measurement result is output as the detection signal Cap.

Here, as a method of measuring the capacitance by the measurement circuit 300 is not limited to the method described with reference to FIG. 4 and FIG. 5, and various techniques configured to measure the capacitance of the piezoelectric element 60 may be applied. However, as illustrated in FIG. 4 and FIG. 5, the measurement circuit 300 may be configured to include the current source 301 that outputs a constant current, the switch 302 that changes the electrical connection between the current source 301 and the piezoelectric element 60, the comparator 303 electrically coupled to the piezoelectric element 60, and the timer circuit 304 that measures the charging time Tch of the piezoelectric element 60 based on the output of the comparator 303. By configuring the measurement circuit 300 as described above, it becomes possible to configure the measurement circuit 300 by a plurality of transistors. As a result, it is possible to realize the measurement circuit 300 as one or a plurality of integrated circuits. Thereby, it becomes possible to miniaturize the measurement circuit 300.

Control Method of Liquid Discharge System

Here, a description will be given of the control method of the liquid discharge system SY described above. A control method of the liquid discharge system SY according to the present embodiment is a control method of the liquid discharge system SY including the piezoelectric element 60 that is displaced based on the drive signal COM to discharge ink and the drive signal output circuit 50 that outputs the drive signal COM, and includes a measurement step of measuring the capacitance of the piezoelectric element 60 and a determination step of determining the deterioration state of the piezoelectric element 60 based on the measured capacitance.

Figure 6:
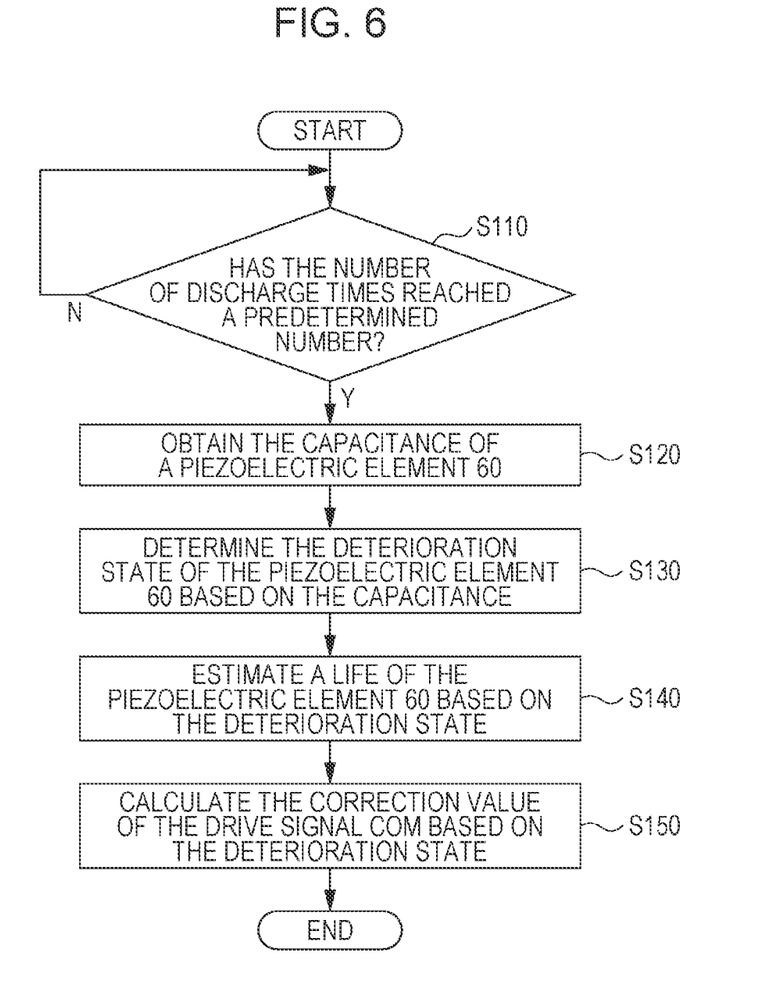
FIG. 6 is a diagram illustrating an example of the control method of the liquid discharge system.

FIG. 6 is a diagram illustrating an example of the control method of the liquid discharge system SY. As illustrated in FIG. 6, in the liquid discharge system SY according to the first embodiment, the control circuit 100 of the liquid discharge apparatus 1 counts the number of discharge times of ink onto a medium. The control circuit 100 then determines whether or not the number of discharge times of ink onto the medium has reached a predetermined number of times (step S110).

When the control circuit 100 determines that the number of discharge times of ink onto a medium has not reached a predetermined number of times (N in step S110), the control circuit 100 does not determine the deterioration state of the piezoelectric element 60 and continues counting the number of discharge times. On the other hand, when the control circuit 100 determines that the number of discharge times of ink onto the medium has reached the predetermined number of times medium (Y in step S110), the control circuit 100 performs the determination of the deterioration state of the piezoelectric element 60 and the processing based on the determination result of the deterioration state. That is to say, in the liquid discharge system SY according to the first embodiment, the control circuit 100 determines the deterioration state of the piezoelectric element 60 by using the number of discharge times of ink onto the medium as a trigger, and determines whether or not the processing based on the determination result of the deterioration state is necessary.

In this regard, the trigger for the control circuit 100 to determine the deterioration state of the piezoelectric element 60 and determine whether or not the processing based on the determination result of the deterioration state is not necessary limited to the number of discharge times of ink described above. For example, the trigger may be when the drive time of the liquid discharge apparatus 1 has reached a predetermined time, when the number of media on which images are formed by the liquid discharge apparatus 1 has reached a predetermined number, or at a timing when the power is turned on to the liquid discharge apparatus 1, and one or a plurality of semiconductor devices including the control circuit 100 has performed a POR (power on reset).

When the control circuit 100 determines that the number of discharge times of ink onto the medium has reached the predetermined number of times (Y in step S110), the control circuit 100 causes the measurement circuit 300 to obtain the capacitance of the piezoelectric element 60 (step S120). Specifically, the control circuit 100 outputs an enable signal EN that enables acquisition of the capacitance of the piezoelectric element 60 to the measurement circuit 300. Thereby, the measurement circuit 300 obtains the capacitance of the piezoelectric element 60 or the physical quantity corresponding to the capacitance of the piezoelectric element 60.

Next, the determination circuit 310 determines the deterioration state of the piezoelectric element 60 based on the capacitance of the piezoelectric element 60 obtained by the measurement circuit 300 or a physical quantity corresponding to the capacitance of the piezoelectric element 60 (step S130). That is to say, the determination circuit 310 determines the deterioration state of the piezoelectric element 60 based on the capacitance of the piezoelectric element 60 measured by the measurement circuit 300. The life estimation circuit 320 estimates the life of the piezoelectric element 60 based on the determination result of the determination circuit 310 (step S140), the correction value calculation circuit 330 calculates the correction value of the drive signal COM (step S150), and the control circuit 100 corrects the drive signal COM based on the correction value of the calculated drive signal COM.

The control method of the liquid discharge system SY described above includes a measurement step of measuring the capacitance of the piezoelectric element 60 by the measurement circuit 300, and a determination step of determining the deterioration state of the piezoelectric element 60 based on the capacitance measured by the determination circuit 310 so that it is possible to detect and determine the deterioration state of the piezoelectric element 60, which might differ depending on the history of the drive condition, with high accuracy and to improve the detection accuracy and the determination accuracy so that it is possible to perform a suitable correction on the drive condition of the piezoelectric element 60, and to improve the calculation accuracy of the estimated life of the piezoelectric element 60.

Here, the drive signal COM is an example of the drive signal, and the drive signal VOUT is also an example of the drive signal in consideration of the point that the drive signal VOUT is a signal generated by determining whether the trapezoid waveform Adp included in the drive signal COM is selected or deselected. Also, the capacitance of the piezoelectric element 60 is an example of the first capacitance, and the capacitance of the dummy piezoelectric element 60d is an example of the second capacitance. The correction value calculation circuit 330 that calculates the correction value of the drive signal COM based on the deterioration state of the piezoelectric element 60 and the control circuit 100 that corrects the voltage of the drive signal COM based on the correction value calculated by the correction value calculation circuit 330 represent an example of the drive voltage correction circuit that corrects the voltage of the drive signal COM based on the capacitance of the piezoelectric element 60.

Operational Advantages

As described above, in the liquid discharge system SY according to the first embodiment, the measurement circuit 300 measures the capacitance of the piezoelectric element 60, and the determination circuit 310 determines the deterioration state of the piezoelectric element 60 based on the capacitance of the piezoelectric element 60 measured by the measurement circuit 300 so that it is possible to determine deterioration of the amount of change of the piezoelectric element 60 regardless of the drive conditions of the piezoelectric element 60.

Also, the liquid discharge system SY according to the present embodiment includes the correction value calculation circuit 330 that corrects the voltage of the drive signal COM based on the deterioration state of the piezoelectric element 60 determined by the determination circuit 310. Thereby, when deterioration occurs in the displacement amount of the piezoelectric element 60, it is possible to reduce the risk of variation in the discharge amount of liquid, and thus to improve the discharge accuracy of ink in the liquid discharge system SY.

Further, the liquid discharge system SY according to the present embodiment includes the life estimation circuit 320 that estimates the life of the piezoelectric element 60 based on the deterioration state of the piezoelectric element 60 determined by the determination circuit 310 and the notification section 110 that provides a notification of the information on the life of the piezoelectric element 60 estimated by the life estimation circuit 320. Thereby, it is possible to notify a user of the life of the piezoelectric element 60 and the life of the liquid discharge system SY at a suitable timing, and thus to improve user convenience.

2. Second Embodiment

Next, a description will be given of a liquid discharge system SY according to a second embodiment. In the description of the liquid discharge system SY according to the second embodiment, the same sign is given to the same component as that of the liquid discharge system SY according to the first embodiment, and a detailed description will be simplified or omitted.

Figure 7:
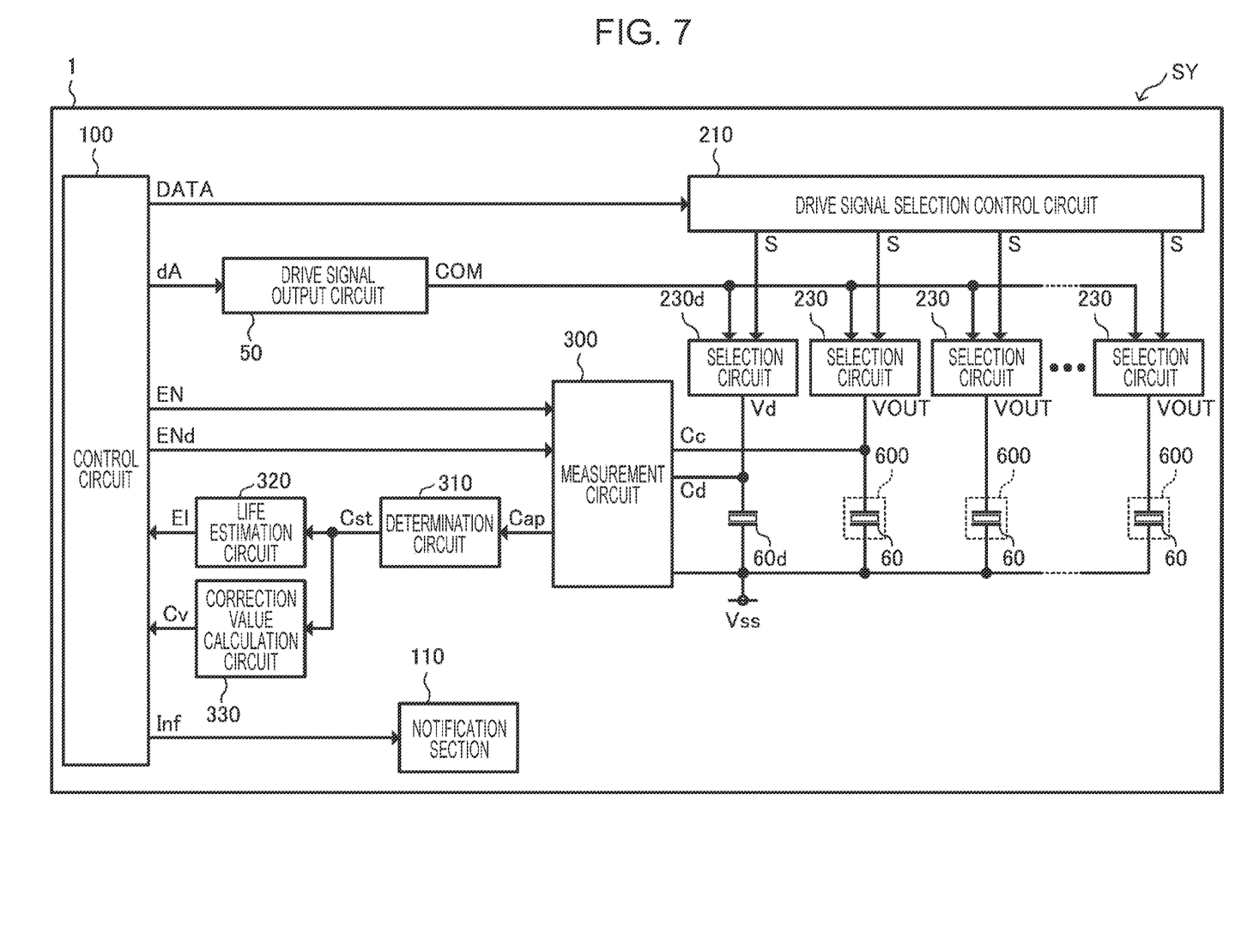
FIG. 7 is a diagram illustrating the configuration to a liquid discharge system according to a second embodiment.

FIG. 7 is a diagram illustrating the configuration of the liquid discharge system SY according to the second embodiment. As illustrated in FIG. 7, the liquid discharge system SY according to the second embodiment includes a dummy piezoelectric element 60d. The dummy piezoelectric element 60d is not a component included in the discharge section 600 unlike the piezoelectric element 60. That is to say, the dummy piezoelectric element 60d does not have the corresponding vibration plate 621, cavity 631, and nozzle 651. Accordingly, the dummy piezoelectric element 60d is displaced in accordance with the drive signal VOUT based on the drive signal COM, but does not discharge ink.

In the liquid discharge system SY according to the second embodiment, the measurement circuit 300 measures the capacitance of the piezoelectric element 60 that discharges ink and the capacitance of the dummy piezoelectric element 60d that does not discharge ink. Specifically, the measurement circuit 300 obtains the voltage value of at least one electrode 611 of the n piezoelectric elements 60 as the detection voltage Cc by receiving an input of the enable signal EN that enables detection of a voltage value from the control circuit 100. The measurement circuit 300 then generates a detection signal Cap corresponding to the capacitance of the piezoelectric element 60 based on the obtained detection voltage Cc and outputs the detection signal Cap to the determination circuit 310. Also, the measurement circuit 300 obtains the voltage value of one electrode of the dummy piezoelectric element 60d as a detection voltage Cd by receiving an input of the enable signal ENd that enables detection of the voltage value from the control circuit 100. The measurement circuit 300 then generates a detection signal Capd corresponding to the capacitance of the dummy piezoelectric element 60d based on the obtained detection voltage Cd and outputs the detection signal Capd to the corresponding determination circuit 310.

In the liquid discharge system SY according to the second embodiment, the measurement circuit 300 determines the deterioration state of the piezoelectric element 60 based on the capacitance of the piezoelectric element 60 and the capacitance of the dummy piezoelectric element 60d. Specifically, the determination circuit 310 compares the detection signal Cap corresponding to the capacitance of the piezoelectric element 60 and the detection signal Capd corresponding to the capacitance of the dummy piezoelectric element 60d and determines the deterioration state of the piezoelectric element 60 based on the comparison result. Here, the dummy piezoelectric element 60d is not a component included in the discharge section 600 that discharges ink, and thus the stress caused by discharge does not affect the dummy piezoelectric element 60d. By using the detection signal Capd indicating the capacitance of the dummy piezoelectric element 60d as described above as a reference value and determining the deterioration state of the piezoelectric element 60, it is possible to determine the deterioration state of the piezoelectric element 60 based on a uniform reference. As a result, it is possible to improve the determination accuracy of the deterioration state by the determination circuit 310.

Here, it is desirable that the dummy piezoelectric element 60d be produced in the same manufacturing process as that of the piezoelectric element 60. Thereby, the risk of causing variations in measuring the deterioration state of the piezoelectric element 60, which are originated from variations in manufacturing, is reduced, and thus it is possible to further improve the determination accuracy of the deterioration state in the determination circuit 310.

Figure 8:
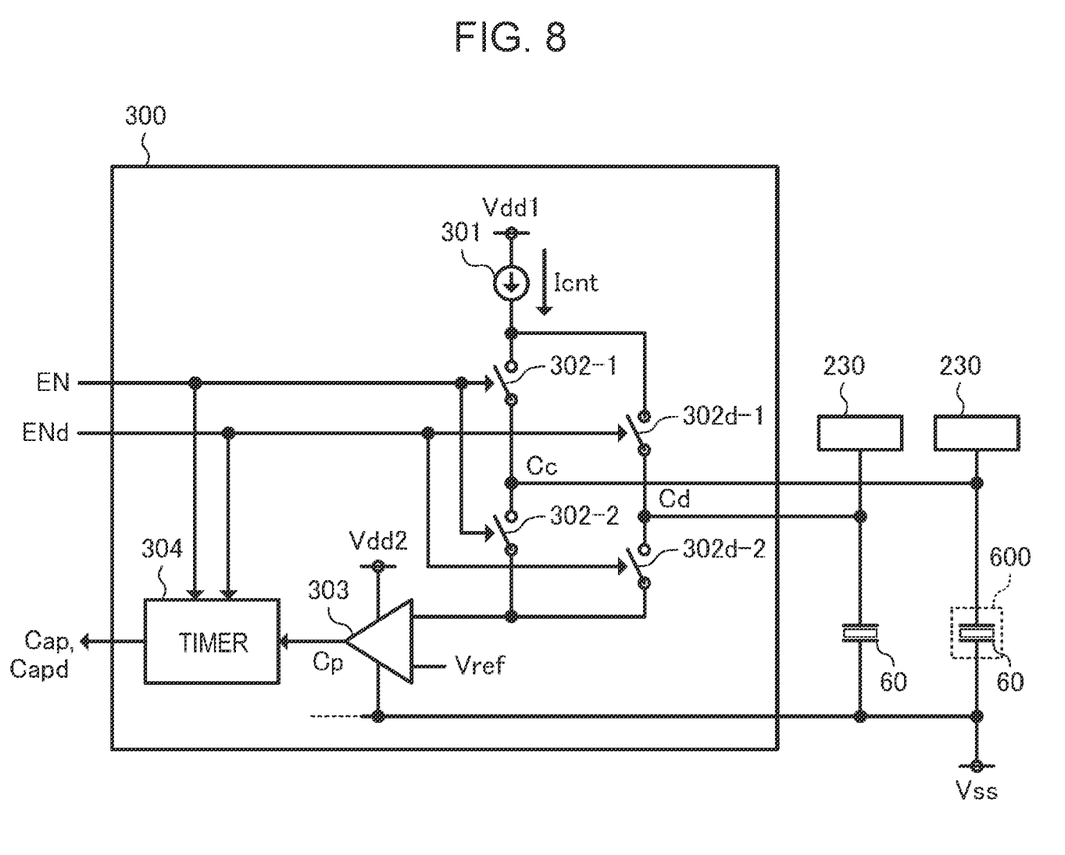
FIG. 8 is a diagram illustrating an example of the configuration of a measurement circuit according to the second embodiment.

Here, a description will be given of an example of the specific configuration of the measurement circuit 300 according to the second embodiment. FIG. 8 is a diagram illustrating an example of the configuration of the measurement circuit 300 according to the second embodiment. As illustrated in FIG. 8, the measurement circuit 300 includes the current source 301, switches 302-1, 302-2, 302d-1, and 302d-2, the comparator 303, and the timer circuit 304.

The current source 301 is supplied with the voltage Vdd1. The current source 301 then generates the constant-value current Icnt based on the voltage Vdd1. The current source 301 as described above may be configured, for example, by one or a combination of a plurality of transistors, a constant-current Zener diode, or the like.

One end of the switch 302-1 is electrically coupled to the output of the current source 301, and the other end is electrically coupled to the electrode 611 of the piezoelectric element 60. Also, one end of the switch 302-2 is electrically coupled to the electrode 611 of the piezoelectric element 60, and the other end is electrically coupled to one input end of the comparator 303. The conduction state of one end and the other end of the switches 302-1 and 302-2 are individually changed based on the enable signal EN input to the respective control ends.

Specifically, when the enable signal EN that enables detection of the capacitance of the piezoelectric element 60 in the measurement circuit 300 is input to the respective control ends of the switches 302-1 and 302-2, one end and the other end of the switches 302-1 and 302-2 are controlled to be conductive. When the enable signal EN that does not enable detection of the capacitance of the piezoelectric element 60 in the measurement circuit 300 is input to the respective control ends of the switches 302-1 and 302-2, one end and the other end of the switches 302-1 and 302-2 are controlled to be nonconductive.

One end of the switch 302d-1 is electrically coupled to the output of the current source 301, and the other end is electrically coupled to one electrode of the dummy piezoelectric element 60d. Also, one end of the switch 302d-2 is electrically coupled to one electrode of the dummy piezoelectric element 60d, and the other end is electrically coupled to one input end of the comparator 303. The conduction state of one end and the other end of the switches 302d-1 and 302d-2 are individually changed based on the enable signal ENd input to the respective control ends.

Specifically, when the enable signal ENd that enables detection of the capacitance of the dummy piezoelectric element 60d in the measurement circuit 300 is input to the respective control ends of the switches 302d-1 and 302d-2, one end and the other end of the switches 302d-1 and 302d-2 are controlled to be conductive. Whereas when the enable signal ENd that does not enable detection of the capacitance of the dummy piezoelectric element 60d in the measurement circuit 300 is input to the respective control ends of the switches 302d-1 and 302d-2, one end and the other end of the switches switch 302d-1 and 302d-2 are controlled to be nonconductive.

Here, the enable signal EN, which is input to the respective control ends of the switches 302-1 and 302-2, and the enable signal ENd, which is input to the respective control ends of the switches 302d-1 and 302d-2, do not become the logical level that enables detection of the capacitance at the same time.

The voltage Vdd2 is supplied to the high-potential side power source terminal of the comparator 303, and the voltage Vss is input to the low-potential side power source terminal of the comparator 303. Also, one input end of the comparator 303 is electrically coupled to the other end of the switch 302-2 and the other end of the switch 302d-2, and the reference voltage Vref is input to the other input end of the comparator 303. When the signal input to one input end exceeds the reference voltage Vref, the comparator 303 outputs the H-level output voltage Cp, and when the signal input to one input end is less than or equal to the reference voltage Vref, the comparator 303 outputs the L-level output voltage Cp.

That is to say, when the enable signal EN that enables detection of the capacitance of the piezoelectric element 60 is input to the measurement circuit 300, the comparator 303 compares the detection voltage Cc and the reference voltage Vref, and outputs the output voltage Cp based on the comparison result. When the enable signal ENd that enables detection of the capacitance of the dummy piezoelectric element 60d is input to the measurement circuit 300, the comparator 303 compares the detection voltage Cd and the reference voltage Vref, and outputs the output voltage Cp based on the comparison result.

The output voltage Cp output by the comparator 303 is input to the timer circuit 304. Also, a clock pulse not illustrated in the figure is input to the timer circuit 304 with the enable signals EN and ENd. The timer circuit 304 then measures a time period from when the enable signal EN that enables detection of the capacitance of the piezoelectric element 60 is input to the measurement circuit 300 to when the output voltage Cp output by the comparator 303 becomes H level, and outputs the measurement result as the detection signal Cap. Also, the timer circuit 304 measures a time period from when the enable signal ENd that enables detection of the capacitance of the dummy piezoelectric element 60d is input to the measurement circuit 300 to when the output voltage Cp output by the comparator 303 becomes H level, and outputs the measurement result to the determination circuit 310 as the detection signal Capd.

The determination circuit 310 compares the detection signal Cap and the detection signal Capd so as to determine the deterioration state of the piezoelectric element 60.

As described above, in the liquid discharge system SY according to the second embodiment, in addition to the same operational advantages of the first embodiment, it is possible to determine the deterioration state of the piezoelectric element 60 on a uniform basis by determining the deterioration state of the piezoelectric element 60 by using the detection signal Capd indicating the capacitance of the dummy piezoelectric element 60d as a reference value. Accordingly, it is possible to further improve the determination accuracy of the deterioration state of the piezoelectric element 60 in the determination circuit 310.

3. Third Embodiment

Next, a description will be given of a liquid discharge system SY according to a third embodiment. In the description of the liquid discharge system SY according to the third embodiment, the same sign is given to the same component as that of the liquid discharge system SY according to the first embodiment and the second embodiment, and a detailed description will be simplified or omitted.

Figure 9:
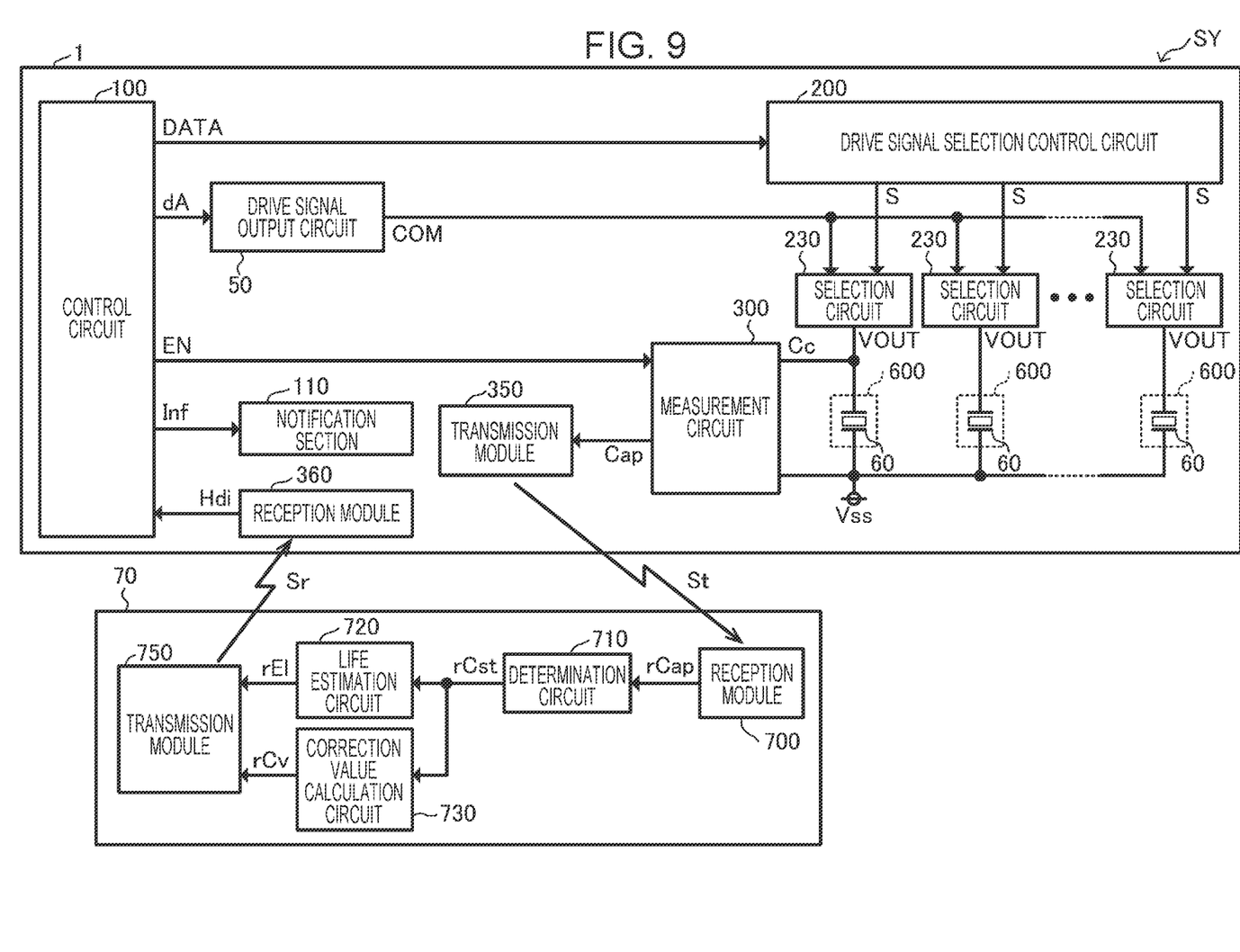
FIG. 9 is a diagram illustrating the configuration to a liquid discharge system according to a third embodiment.

FIG. 9 is a diagram illustrating the configuration of a liquid discharge system SY according to the third embodiment. As illustrated in FIG. 9, the liquid discharge system SY according to the third embodiment includes a liquid discharge apparatus 1 including the piezoelectric element 60 that is displaced and discharges ink based on the drive signal COM, and a server 70 configured to communicate with the liquid discharge apparatus 1.

The liquid discharge apparatus 1 according to the third embodiment includes a transmission module 350 and a reception module 360 instead of the determination circuit 310, the life estimation circuit 320, and the correction value calculation circuit 330. Also, the server 70 includes a reception module 700, a transmission module 750, a determination circuit 710, a life estimation circuit 720, and a correction value calculation circuit 730. Here, the determination circuit 710 held by the server 70 corresponds to the determination circuit 310 according to the first embodiment and the second embodiment, the life estimation circuit 720 held by the server 70 corresponds to the life estimation circuit 320 according to the first embodiment and the second embodiment, and the correction value calculation circuit 730 held by the server 70 corresponds to the correction value calculation circuit 330 according to the first embodiment and the second embodiment.

The transmission module 350 receives the detection signal Cap output by the measurement circuit 300. The transmission module 350 transmits the input detection signal Cap to the reception module 700 of the server 70 as a communication signal St. The reception module 700 receives the communication signal St transmitted by the transmission module 350. The reception module 700 then obtains the detection signal Cap from the received communication signal St and outputs the obtained detection signal Cap to the determination circuit 710 as a detection signal rCap. That is to say, the transmission module 350 and the reception module 700 are configured to communicate with each other. The transmission module 350 and the reception module 700 are connected, for example, by the communication via the internet.

The determination circuit 710 determines the deterioration state of the piezoelectric element 60 held by the liquid discharge apparatus 1 based on the detection signal rCap in the same manner as the determination circuit 310 according to the first embodiment, and outputs a state signal rCst indicating the determination result to the life estimation circuit 720 and the correction value calculation circuit 730.

The life estimation circuit 720 estimates the life of the piezoelectric element 60 held by the liquid discharge apparatus 1 based on the input state signal rCst in the same manner as the life estimation circuit 320 according to the first embodiment. The life estimation circuit 720 then outputs a life notification signal rEl including the information on the estimated life of the piezoelectric element 60 to the transmission module 750.

The correction value calculation circuit 730 determines whether or not to correct the voltage of the drive signal COM that drives the piezoelectric element 60 held by the liquid discharge apparatus 1 based on the input state signal rCst in the same manner as the correction value calculation circuit 330 according to the first embodiment. When the correction value calculation circuit 730 determines that the correction of the voltage of the drive signal COM is necessary, the correction value calculation circuit 730 calculates the correction value for correcting the voltage of the drive signal COM and outputs the correction signal rCv including the information on the calculating correction value to the transmission module 750.

The transmission module 750 transmits a signal including at least one of the life notification signal rEl input from the life estimation circuit 720 and the correction signal rCv input from the correction value calculation circuit 730 to the reception module 360 of the liquid discharge apparatus 1 as a communication signal Sr. The reception module 360 receives the communication signal Sr transmitted from the transmission module 750. The reception module 360 then generates a state signal Hdi including at least one of the life notification signal rEl and the correction signal Cv from the received communication signal Sr, and outputs the state signal Hdi to the control circuit 100. That is to say, the transmission module 750 and the reception module 360 are configured to communicate with each other. The transmission module 750 and the reception module 360 are connected, for example, by the communication via the internet.

When the input state signal Hdi includes the life notification signal rEl, and the life notification signal rEl included in the input state signal Hdi includes information indicating that the piezoelectric element 60 will soon reach the end of life, or information indicating that the piezoelectric element 60 has already reached the end of life, the control circuit 100 generates the notification signal Inf for notifying the user that the piezoelectric element 60 will soon reach the end of life or the piezoelectric element 60 has already reached the end of life, and outputs the notification signal Inf to the notification section 110.

Also, when the input state signal Hdi includes the correction signal Cv, the control circuit 100 corrects the reference drive signal dA in accordance with the input correction signal Cv, and outputs the reference drive signal dA to the drive signal output circuit 50.

As described above, the liquid discharge system SY according to the third embodiment includes the liquid discharge apparatus 1 including the piezoelectric element 60 and the server 70 configured to communicate with the liquid discharge apparatus 1. The liquid discharge apparatus 1 includes the piezoelectric element 60 that is displaced in accordance with the drive signal VOUT based on the drive signal COM and discharges ink, the drive signal output circuit 50 that outputs the drive signal COM, and the measurement circuit 300 that measured the capacitance of the piezoelectric element 60. The server 70 includes the reception module 700 that receives the communication signal St including the information on the capacitance of the piezoelectric element 60, the determination circuit 710, and the transmission module 750 that transmits the communication signal Sr including at least one of the life notification signal rEl in accordance with the state signal rCst, which is the determination result by the determination circuit 710 and the correction signal rCv.

That is to say, the server 70 included in the liquid discharge system SY according to the third embodiment is the server 70 configured to communicate with the liquid discharge apparatus 1 including the piezoelectric element 60 that is displaced in accordance with the drive signal VOUT based on the drive signal COM to discharge ink. The server 70 includes the reception module 700 that receives the communication signal St including the capacitance of the piezoelectric element 60 measured by the measurement circuit 300, the determination circuit 710 that determines the deterioration state of the piezoelectric element 60 based on the communication signal St, and the transmission module 750 that transmits the communication signal Sr including at least one of the life notification signal rEl in accordance with the state signal rCst, which is the determination result produced by the determination circuit 710, and the correction signal rCv.

The liquid discharge system SY and the server 70 configured as described above have the same operational advantages as those of the liquid discharge system SY according to the first embodiment.

Here, the communication signal St including the information on the capacitance of the piezoelectric element 60 held by the liquid discharge apparatus 1 is an example of the capacitance information, the reception module 700 that receives the communication signal St is an example of the reception section, the determination circuit 710 of the server 70 is an example of the determination circuit according to the third embodiment, the communication signal Sr based on the state signal rCst indicating the determination result of the deterioration state of the piezoelectric element 60 determined by the determination circuit 710 is an example of the determination result information, and the transmission module 750 that transmits the communication signal Sr is an example of the transmission section.

In the above, descriptions have been given of the embodiments and the variations. However, the present disclosure is not limited to those embodiments. It is possible to carry out the present disclosure in various aspects without departing from the spirit and scope of the disclosure. For example, it is possible to suitably combine the embodiments described above.

The present disclosure includes a component having substantially the same component described in the embodiments (for example, a component having the same function, method and result or a component having the same purpose and advantages). Also, the present disclosure includes a component of which nonessential part is replaced. Also, the present disclosure includes a component configured to have the same operational advantages or accomplish the same purposes as those of the component described in the embodiments. Also, the present disclosure includes a component produced by adding a publicly known technique to the component described in the embodiments.

The following contents are derived from the embodiments described above.

A liquid discharge system including: a piezoelectric element that is displaced based on a drive signal and discharges liquid; a drive signal output circuit that outputs the drive signal; a measurement circuit that measures a first capacitance of the piezoelectric element; and a determination circuit that determines a deterioration state of the piezoelectric element based on the first capacitance.

With the liquid discharge system, the deterioration state of the piezoelectric element is determined based on the capacitance of the piezoelectric element so that it is possible to obtain the displacement amount of the piezoelectric element accurately without depending on the drive history of the piezoelectric element.

The liquid discharge system described above may further include: a drive voltage correction circuit that corrects a voltage of the drive signal in accordance with the deterioration state.

With the liquid discharge system, it is possible to optimally correct the drive signal in accordance with the displacement amount of the piezoelectric element.

The liquid discharge system described above may further include: a life estimation circuit that estimates a life of the piezoelectric element based on the deterioration state; and a notification section that provides a notification of the information on the life estimated by the life estimation circuit.

With the liquid discharge system, it is possible to notify a user of the life of at least one of the piezoelectric element and the liquid discharge system based on the displacement amount of the piezoelectric element.

In the liquid discharge system described above, the measurement circuit may include a current source that outputs a constant current, a switch that changes electrical coupling with the current source and the piezoelectric element; and a comparator electrically coupled to the piezoelectric element.

With the liquid discharge system, it is possible to measure the capacitance of the piezoelectric element with high accuracy based on the resolution of the clock signal.

The liquid discharge system described above may further include: a dummy piezoelectric element that is displaced in accordance with the drive signal and does not discharge liquid, wherein the measurement circuit may measure a second capacitance of the dummy piezoelectric element, and the determination circuit may determine the deterioration state of the piezoelectric element based on the first capacitance and the second capacitance.

With the liquid discharge system, it is possible to determine the deterioration state of the piezoelectric element in consideration of the parameters, such as temperature, humidity, or the like.

The liquid discharge system described above may further include: a liquid discharge apparatus including the piezoelectric element; and a server configured to communicate with the liquid discharge apparatus, wherein the server may include a reception section that receives capacitance information including the first capacitance, the determination circuit, and a transmission section that transmits determination result information including a determination result of the determination circuit.

A server configured to communicate with a liquid discharge apparatus including a piezoelectric element that is displaced based on a drive signal and discharges liquid, the server may include: a reception section that receives capacitance information including a capacitance of the piezoelectric element measured by a measurement circuit; a determination circuit that determines a deterioration state of the piezoelectric element based on the capacitance information; and a transmission section that transmits determination result information including a determination result of the determination circuit.

With the server, the deterioration state of the piezoelectric element is determined based on the capacitance of the piezoelectric element so that it is possible to obtain the displacement amount of the piezoelectric element accurately without depending on the drive history of the piezoelectric element.

A control method of a liquid discharge system including a piezoelectric element that is displaced based on a drive signal and discharges liquid, and a drive signal output circuit that outputs the drive signal, the control method may include: a measurement step of measuring a capacitance of the piezoelectric element; and a determination step of determining a deterioration state of the piezoelectric element based on the capacitance.

With the liquid discharge system, the deterioration state of the piezoelectric element is determined based on the capacitance of the piezoelectric element so that it is possible to obtain the displacement amount of the piezoelectric element accurately without depending on the drive history of the piezoelectric element.

What is claimed is:

1. A liquid discharge system comprising:
   a piezoelectric element that is displaced based on a drive signal and discharges liquid;
   a drive signal output circuit that outputs the drive signal;
   a measurement circuit that measures a first capacitance of the piezoelectric element;
   a determination circuit that determines a deterioration state of the piezoelectric element based on the first capacitance;
   a life estimation circuit that estimates a life of the piezoelectric element based on the deterioration state and generates a life notification signal including information on an estimated life of the piezoelectric element to notify a user that the piezoelectric element will reach an end of the life of the piezoelectric element, or that the piezoelectric element has already reached the end of the life of the piezoelectric element;
   a control circuit that generates, based on the life notification signal, a notification signal that notifies the user that the piezoelectric element will reach the end of the life of the piezoelectric element, or that the piezoelectric element has already reached the end of the life of the piezoelectric element, and that outputs the notification signal; and
   a notification section that provides the user with a notification of information on the life of the piezoelectric element based on the notification signal.

2. The liquid discharge system according to claim 1, further comprising:
   a drive voltage correction circuit that corrects a voltage of the drive signal in accordance with the deterioration state.

3. The liquid discharge system according to claim 1, wherein
   the measurement circuit includes
   a current source that outputs a constant current,
   a switch that changes electrical coupling with the current source and the piezoelectric element; and
   a comparator electrically coupled to the piezoelectric element.

4. The liquid discharge system according to claim 1, further comprising:
   a dummy piezoelectric element that is displaced in accordance with the drive signal, but does not discharge liquid, wherein
   the measurement circuit measures a second capacitance of the dummy piezoelectric element, and
   the determination circuit determines the deterioration state of the piezoelectric element based on the first capacitance and the second capacitance.

5. The liquid discharge system according to claim 1, further comprising:
   a liquid discharge apparatus including the piezoelectric element; and
   a server configured to communicate with the liquid discharge apparatus, wherein
   the server includes
   a reception section that receives capacitance information including the first capacitance,
   the determination circuit, and
   a transmission section that transmits determination result information including a determination result of the determination circuit.

6. A server configured to communicate with a liquid discharge apparatus including a piezoelectric element that is displaced based on a drive signal and discharges liquid, the server comprising:
   a reception section that receives capacitance information including a capacitance of the piezoelectric element measured by a measurement circuit;

a determination circuit that determines a deterioration state of the piezoelectric element based on the capacitance information;

a life estimation circuit that estimates a life of the piezoelectric element based on the deterioration state and generates a life notification signal including information on an estimated life of the piezoelectric element to notify a user that the piezoelectric element will reach an end of the life of the piezoelectric element, or that the piezoelectric element has already reached the end of the life of the piezoelectric element; and a transmission section that transmits the life notification signal.

7. A control method of a liquid discharge system including a piezoelectric element that is displaced based on a drive signal and discharges liquid, and a drive signal output circuit that outputs the drive signal, the control method comprising:

measuring a capacitance of the piezoelectric element;

determining a deterioration state of the piezoelectric element based on the capacitance;

estimating a life of the piezoelectric element based on the deterioration state, and generating a life notification signal including information on an estimated life of the piezoelectric element to notify a user that the piezoelectric element will reach an end of the life of the piezoelectric element, or that the piezoelectric element has already reached the end of the life of the piezoelectric element;

generating, based on the life notification signal, a notification signal that notifies the user that the piezoelectric element will reach the end of the life of the piezoelectric element, or that the piezoelectric element has already reached the end of the life of the piezoelectric element, and outputting the notification signal; and providing the user with a notification of information on the life of the piezoelectric element based on the notification signal.

\* \* \* \* \*